(12) United States Patent
Cazals

(10) Patent No.: US 7,963,479 B2
(45) Date of Patent: Jun. 21, 2011

(54) METHOD FOR FIXING AN ENGINE STRUT TO AN AIRPLANE WING

(75) Inventor: Olivier Cazals, Daux (FR)

(73) Assignee: Airbus France, Toulouse (FR)

( * ) Notice: Subject to any disclaimer, the term of this patent is extended or adjusted under 35 U.S.C. 154(b) by 193 days.

(21) Appl. No.: 11/719,891

(22) PCT Filed: Nov. 17, 2005

(86) PCT No.: PCT/FR2005/002851
§ 371 (c)(1),
(2), (4) Date: May 22, 2007

(87) PCT Pub. No.: WO2006/056678
PCT Pub. Date: Jun. 1, 2006

(65) Prior Publication Data
US 2009/0108127 A1    Apr. 30, 2009

(30) Foreign Application Priority Data

Nov. 23, 2004  (FR) .................................. 04 12408

(51) Int. Cl.
*B64D 27/26*    (2006.01)
*B64C 3/32*    (2006.01)
(52) U.S. Cl. ....................................................... 244/54

(58) Field of Classification Search .................... 244/54, 244/55, 53 R; 248/554
See application file for complete search history.

(56) References Cited

U.S. PATENT DOCUMENTS

| 4,213,585 | A | * | 7/1980 | Murphy | 244/54 |
| 5,806,792 | A | * | 9/1998 | Brossier et al. | 244/54 |
| 2004/0129832 | A1 | | 7/2004 | Marche | |
| 2005/0082423 | A1 | * | 4/2005 | Whitmer et al. | 244/54 |

FOREIGN PATENT DOCUMENTS

| FR | 2698068 A1 | * | 5/1994 |
| SU | 1099538 A1 | * | 10/1996 |

OTHER PUBLICATIONS

XP-002335277 Derwent Abstract for foreign patent SU 1099538 A1, 1997.*
PCT International Search Report dated Mar. 15, 2006.

* cited by examiner

*Primary Examiner* — Tien Dinh
*Assistant Examiner* — Richard R Green
(74) *Attorney, Agent, or Firm* — Dickinson Wright PLLC

(57) ABSTRACT

The inventive fixing system comprises a front attachment (6), a rear attachment (7) and an intermediate attachment (8) connecting a strut (1) to a wing (2), wherein the lower fitting (17) of the rear attachment (7) is fixedly connected to the transversal rear face (1 G) of said strut on the extension thereof and said lower fitting (17) is substantially in flush with the top face of the strut.

9 Claims, 6 Drawing Sheets

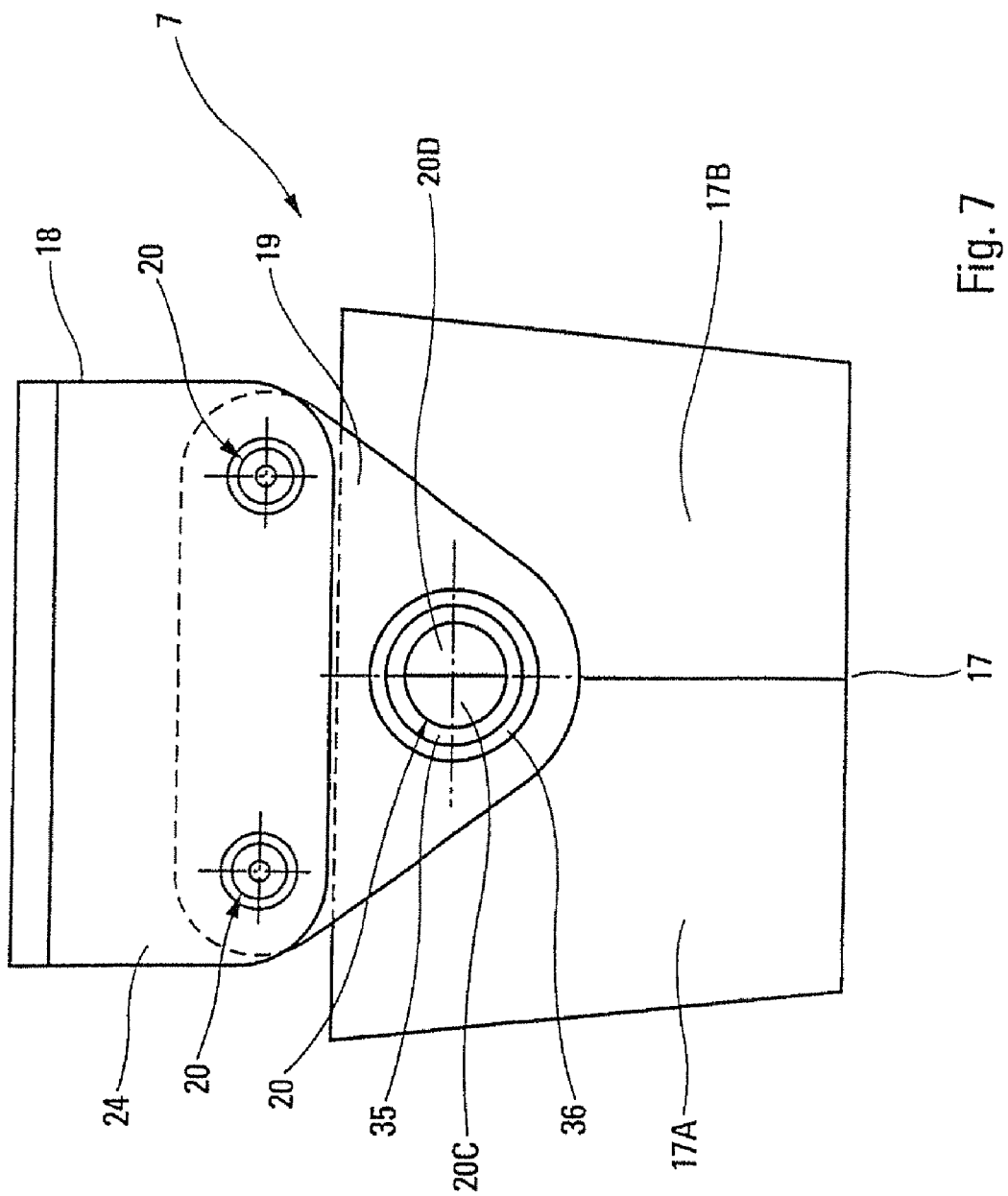

METHOD FOR FIXING AN ENGINE STRUT TO AN AIRPLANE WING

The present invention relates to a system for fixing a strut bearing an engine of an airplane to the corresponding wing of the wing structure of said airplane.

It is known that wing engines, such as jet engines, are connected to the wings of the airplane by way of structural struts which perform the function of connection interface between the wing structure and the engines. Hence, a suitable fixing system is provided for connecting the strut to the wing, while another fixing system, which is extraneous to the system of the invention, is used to connect the engine to the strut.

For example, on transport or other airplanes equipped with wing engines, the struts are produced particularly from longitudinal members and ribs joined together to form a rigid box having an elongate configuration of variable, generally rectangular cross section.

The system for fixing the strut to the wing is generally situated between substantially the rear half of the upper portion of said strut and the corresponding portion of the underside of the wing and is composed of a front attachment, of a rear attachment and of an intermediate attachment whose arrangement and design are determined and certified for efficiently withstanding the forces and moments likely to be generated along the three axes of the airplane (roll X, pitch Y and yaw Z).

In particular, the front and rear attachments of the fixing system are composed of lower fittings emanating from the upper face of the strut, of upper fittings emanating correspondingly from the underside of the wing, and of connecting links which connect said corresponding fittings by way of joint pins oriented along the pitch axis of the airplane in the case of the front attachment and along the roll axis in the case of the rear attachment. As regards the intermediate attachment, it may comprise a stud or shaft emanating from the underside of the wing and engaging in a swivel provided in the upper face of the strut, the stud/swivel assembly being substantially arranged along the yaw axis of the airplane. Thus, the operation of mounting the strut with respect to the wing is determined by the fixing system and requires a certain amount of space between the strut and the wing for the arrangement of said attachments.

Furthermore, it is known that aircraft manufacturers are seeking to reduce the development costs of new airplanes. Hence, one of the routes explored consists in using one and the same engine for equipping a number of different airplanes, for example an engine which can both be mounted on a long-haul airplane such as a four-engine jet and on a medium-haul airplane such as a twin-engine jet. However, making this happen is barely conceivable, not to say impossible, at the present time if only because of the dimensional problems involved. Specifically, the engines equipping large-capacity airplanes have a large diametral dimension (especially at the fan level) which is in any case clearly greater than that of the lower-power engines equipping medium-capacity airplanes, with the result that if large engines were mounted on the struts of medium-haul airplanes instead of the less powerful engines, the lower portion of these large engines would be too close to the ground, which would prohibit installation thereof.

The object of the present invention is to overcome these disadvantages and concerns a system for fixing an engine strut to the wing of an airplane, the design of which system makes it possible to increase the distance separating the strut from the ground and thus to be able to mount both large-power and medium-power engines without modifying the structural strut.

To this end, the system for fixing an airplane engine strut to the corresponding wing of the wing structure of said airplane, of the type comprising a front attachment, a rear attachment and an intermediate attachment which connect said strut to said wing and are arranged substantially along the pitch, roll and yaw axes, respectively, of said airplane, said rear attachment being a single attachment and comprising a lower fitting secured to said strut, an upper fitting secured to said wing and at least one link which, by way of parallel joint pins, connects said lower and upper fittings, is noteworthy, according to the invention, in that said lower fitting of said rear attachment has a size substantially analogous to said rear transverse face of said strut and is arranged fixedly on said rear transverse face, in the continuation of said strut, said lower fitting coming, at most, substantially flush with the upper face of said strut.

Thus, by virtue of the invention, since the rear lower fitting no longer projects from the upper face of the strut, this upper face can be brought as close as possible to the underside of the wing, with the result that a dimensionally larger engine can be mounted under the strut since the distance separating the strut from the ground is increased. For example, an airplane initially equipped with engines of a given power could, by virtue of the system for fixing the struts to the wing structure, receive more powerful engines in spite of the increase in the dimensions of these engines. The advantages in terms of operating cost are clearly apparent. Moreover, there results a much more compact strut/wing connection, a factor which is beneficial both mechanically and aerodynamically.

Likewise, with a strut as close as possible to the wing, it is possible to re-engine certain airplanes equipped with old-generation engines with more modern large-fan engines.

It will be noted that said lower fitting extends and completely covers the rear transverse face of the strut to form an integral part thereof.

According to a preferred embodiment, said lower fitting of the rear attachment is a one-piece component fixed to said rear transverse face of the strut and having the shape of a clevis intended to receive said link by way of said joint pin parallel to the roll axis of said airplane.

In a variant embodiment, said lower fitting may be composed of two substantially identical components arranged side by side and bearing said joint pin parallel to said roll axis and about which said link is mounted.

Furthermore, said lower fitting may define said rear face of the strut and thus form an integral part of its structure.

With regard to said upper fitting of the rear attachment, this is likewise a U-shaped one-piece component whose base is secured to the underside of said wing.

For reasons of safety, said rear attachment comprises two identical links which are superposed one against the other and connect said lower and upper fittings by way of said joint pins.

Advantageously, said link has the shape of an at least isosceles triangular plate whose base is articulated on the lower fitting about two parallel pins, whereas the vertex opposite said base is articulated on the upper fitting about a single pin, parallel to the other two.

In a variant, the base of said triangular link could be articulated on the upper fitting about two parallel pins, whereas the vertex opposite said base is articulated on the lower fitting about a single pin, parallel to the other two. This arrangement thus allows a reduction in the width of the strut box, thereby improving the aerodynamic performance of the propulsion system.

Preferably, each joint pin of said rear attachment is double and comprises a hollow outer pin inside which is concentrically arranged an inner pin, the two pins of each joint connecting the link to the corresponding fitting.

However, when said lower fitting is composed of two identical components, said joint pin of the lower fitting consists of two longitudinal half-pins which respectively project from said components and which, when said components are arranged side by side, form said joint pin.

Moreover, and again for safety purposes, on either side of said upper fitting there are provided reinforcing brackets superposed on said fitting.

The figures of the appended drawing will give a clear understanding of how the invention can be implemented. In these figures, identical references denote like elements.

Figure 5:
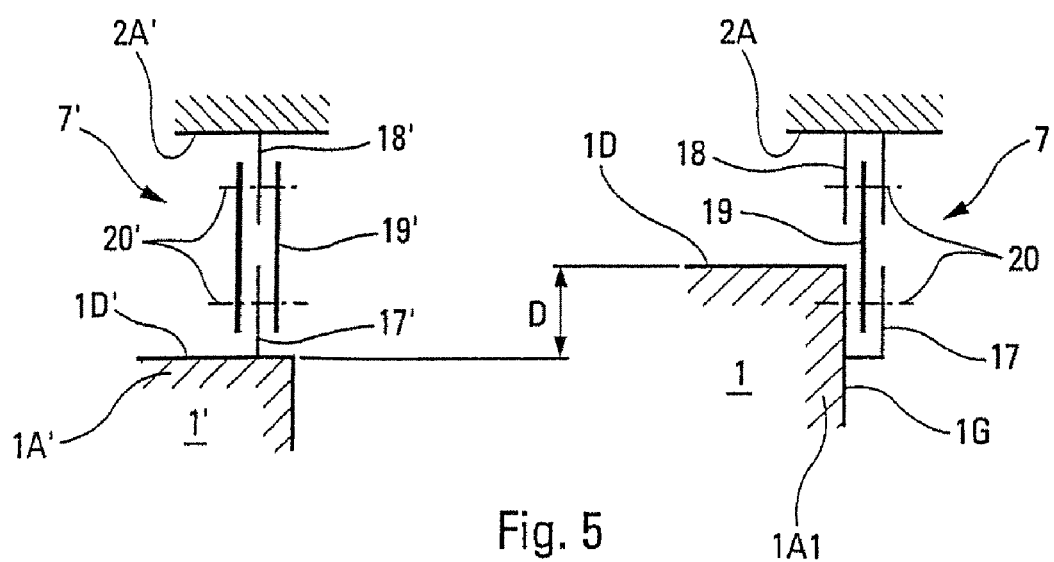

FIG. 5 schematically shows the gain in height obtained by the design of the rear attachment according to the invention by comparison with the known rear attachment.

Figure 6:
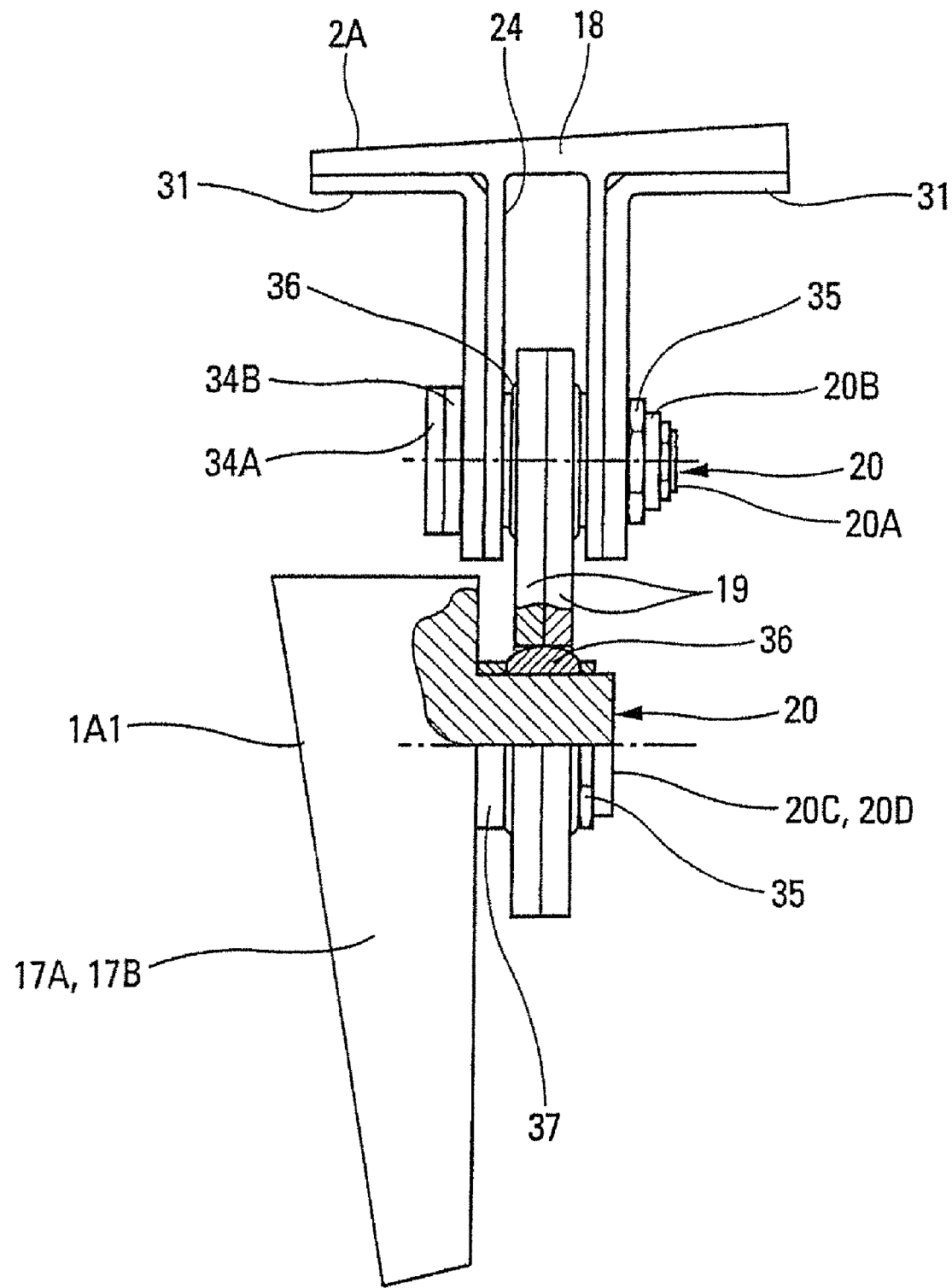

FIGS. 6 and 7 are a side view and a rear view, respectively, of a variant embodiment of said rear attachment.

Figure 1:
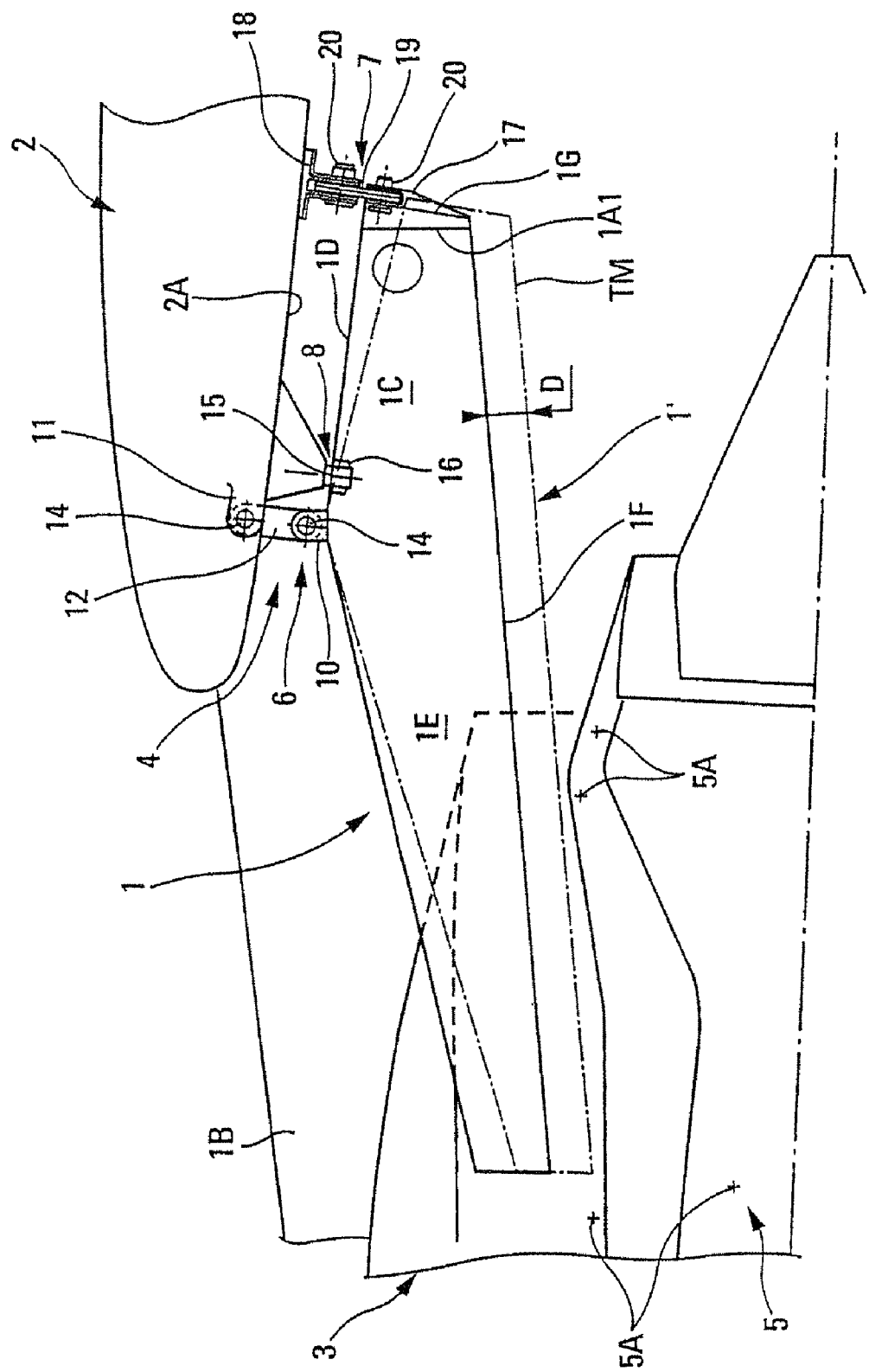
FIG. 1 is a schematic longitudinal plan view of an airplane engine strut joined to its respective wing by the fixing system according to the invention.
Figure 2:
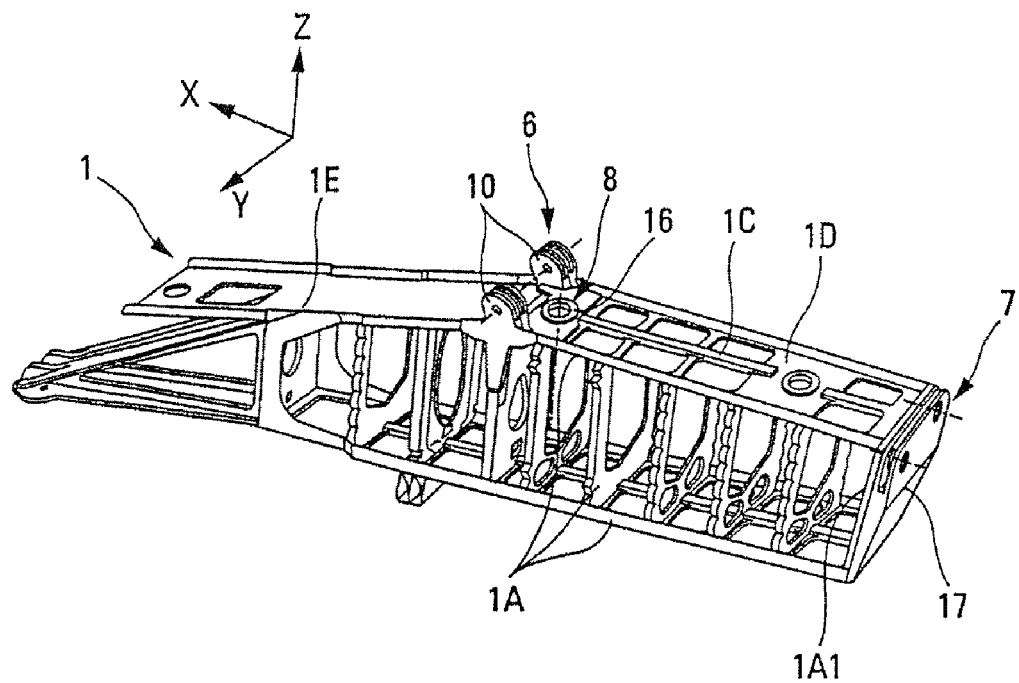
FIG. 2 is a schematic perspective view showing the general structure of said strut with the associated fittings of said fixing system.

The strut 1, represented in FIGS. 1 and 2, provides the connection interface between the wing 2 of an airplane and the engine 3. It is structurally composed of longitudinal members, plates, ribs, etc. 1A joined together by any suitable means conventionally used in this field and forming a rigid elongate box of roughly parallelepipedal shape substantially parallel to the longitudinal roll axis X (marker, FIG. 2) of the airplane. Of course, fairings 1B envelope the strut 1 to provide aerodynamic continuity between the wing 2 and the engine 3.

As shown in FIG. 1, approximately the rear half 1C of the strut is situated below the wing 2 and has its corresponding rear upper face 1D fastened to the underside 2A of the wing by way of a fixing system 4. As regards the front half 1E of the strut, it bears the engine 3 likewise using a fixing system 5, which, however, differs from that of the invention and is symbolized by the attachment points 5A, allowing a connection between the front lower face 1F of the strut and the relevant structural portions of the engine 3.

The fixing system 4 for fixing the strut 1 to the wing 2 conventionally comprises a front attachment 6, a single rear attachment 7 and an intermediate attachment 8.

In brief, the front attachment 6 is situated substantially in the center of the upper face 1D of the strut and is in fact double since it is composed of two identical aligned sets of fittings 10 emanating from the box and projecting from its upper face (FIGS. 1 and 2) and of fittings 11 emanating from the underside of the wing (FIG. 1), connected together by flat links 12 superposed about respective pins 14. These pins extended transversely to the elongate box of the strut 1, that is to say substantially parallel to the pitch axis Y of the airplane. The intermediate attachment 8 for its part is situated behind the front attachment 6 in the longitudinal center plane of symmetry of the strut and is composed of a stud or shaft 15 projecting from the bottom surface of the wing to which it is secured and which engages in a swivel 16 correspondingly provided in the upper face 1D of the strut. This stud/swivel attachment is arranged approximately vertically along the yaw axis Z of the airplane.

With regard to the rear attachment 7, it comprises a lower fitting 17 fixed to the strut, two identical superposed flat links 19 and an upper fitting 18 fixed to the underside of the wing. Parallel joint pins 20 connect the ends of the links 19 to the respective fittings 17, 18 and extend substantially along the roll axis X of the airplane. Such an arrangement of the attachments 6, 7 and 8 along the axes X, Y and Z makes it possible to withstand the forces and moments which occur in the three dimensions and to provide an optimum strut/wing connection.

According to the invention, the lower fitting 17 of the rear attachment 7 of the strut 1 is situated on the rear transverse face 1G of the strut, in the continuation thereof, with the result that the fitting 17 does not protrude beyond the upper face 1D of the strut, as shown particularly in FIGS. 1 and 2.

In this exemplary embodiment represented in FIGS. 1 to 4, the lower fitting 17 is a one-piece structural component of U-shaped cross section, analogous to a clevis 21, one 22 of whose lateral sides 22, 23 is attached to the back of the strut on its last transverse structural rib 1A1, the links engaging between said sides of the clevis. More specifically, the lateral side 22 of the clevis, corresponding to a rigid plate, has a size which is substantially analogous to the rear transverse face 1G of said strut rib, with the result that the fitting advantageously extends the strut while remaining inscribed in its transverse face.

Of course, the fitting 17 is secured to the last structural rib 1A1 of said strut by any suitable means known per se.

Analogously, the upper fitting 18 is likewise a one-piece structural component corresponding to a clevis 24 of U-shaped cross section, the base 25 of which is attached fixedly to the structure of the underside 2A of the wing by any suitable means.

Figure 3:
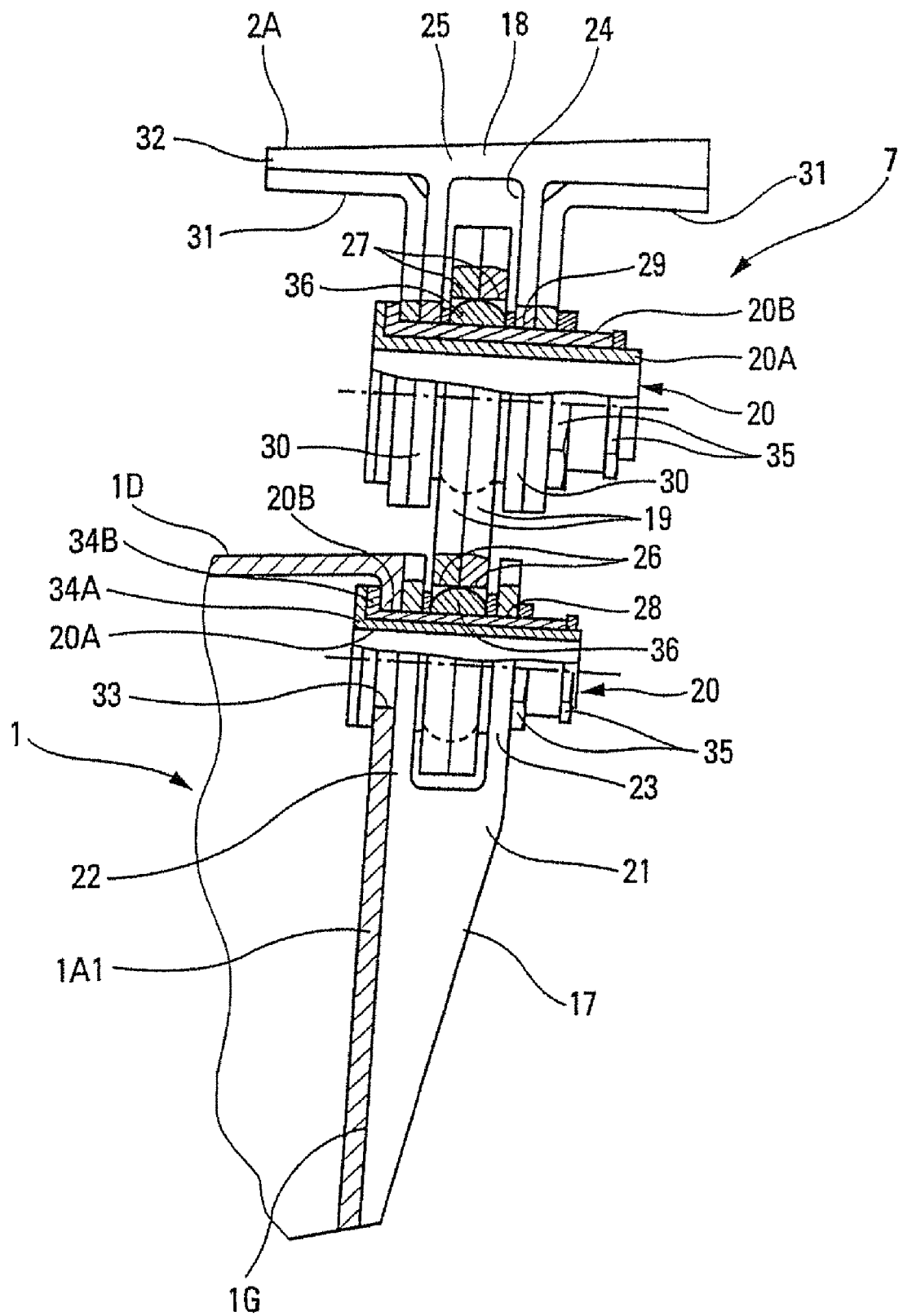
FIG. 3 is a partially sectional enlarged side view of the rear attachment of the fixing system represented in FIG. 1.
Figure 4:
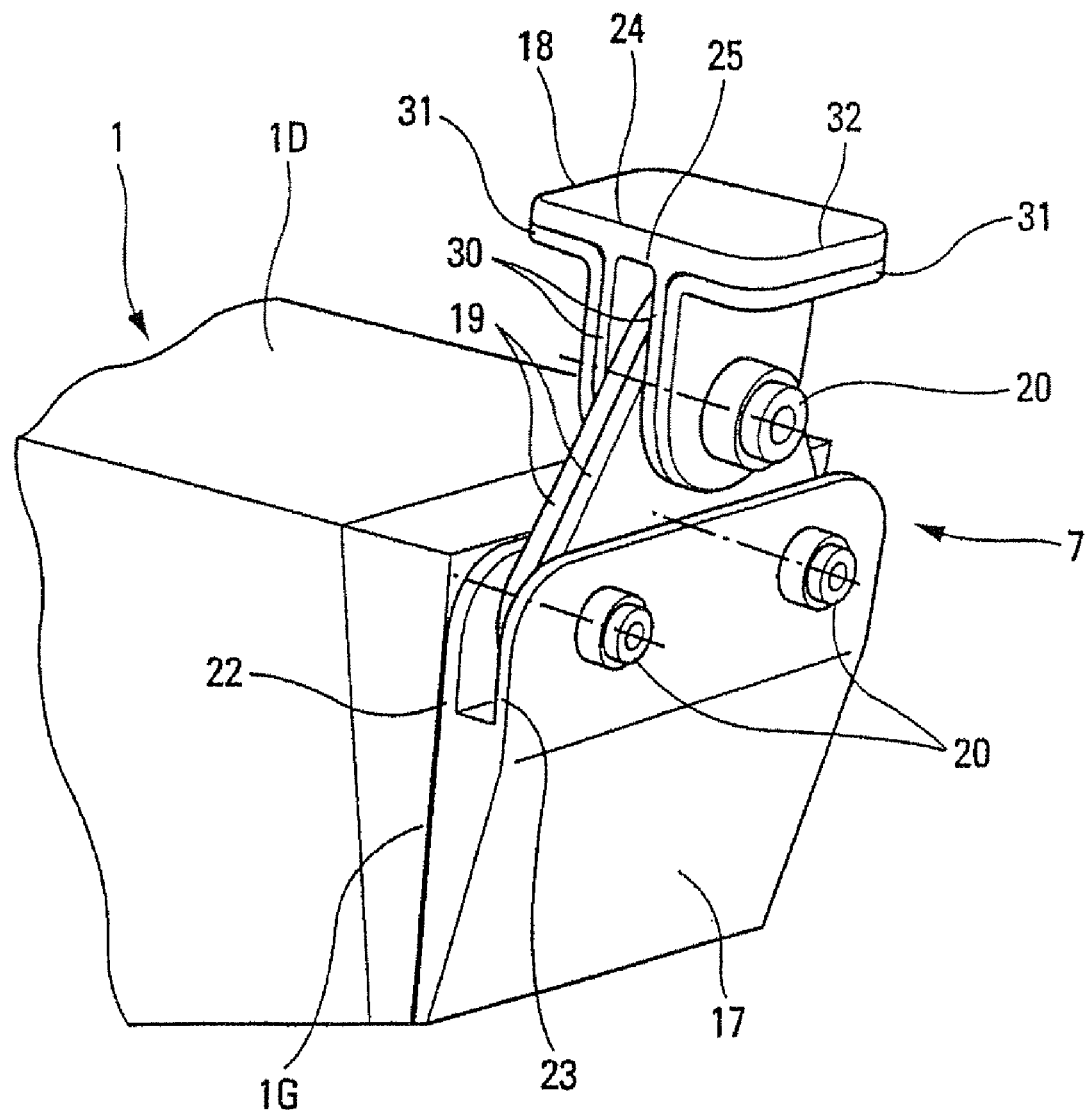
FIG. 4 is a rear perspective view of said rear attachment.

As shown in FIGS. 3 and 4, the two identical connecting links 19 for their part have an isosceles or equilateral triangular shape, with, in this example, two joint pins 20 connecting the superposed links to the lower fitting 17 and one joint pin 20 connecting these links to the upper fitting 18. Thus, two parallel sets of two aligned through holes 26 are provided in the base of the superposed links 19, whereas only one set of two aligned through holes 27, parallel to the holes 26, are formed in the opposite vertex of the triangular links. The links engage in the U-shaped devises 21 and 24 of the lower 17 and upper 18 fittings and are united with these respectively by means of the two joint pins 20 passing through the through holes 26 formed in the links and through the corresponding holes 28 provided in the lateral sides 22, 23 of the lower clevis 21, and 33 provided in the last rib 1A1, and by means of a joint pin 20 passing through the through holes 27 and through the corresponding holes 29 provided in the lateral sides 30 of the upper clevis 24.

Furthermore, it will be noted from FIG. 3 that the joint pins 20 are double, that is to say that they are each defined by two respectively inner 20A and outer 20B concentric tubular pins arranged one inside the other for reasons of safety in particular, like the arrangement of the two superposed links 19. Likewise, two reinforcing brackets 31 are respectively provided on either side of the upper fitting 18, being mounted on the corresponding joint pin 20 used to articulate the links on the U-shaped clevis and being fitted against outer portions 32 which extend the base 25 of said clevis.

Moreover, it can also be seen that the pins 20 are immobilized axially in position. For that purpose, they terminate at one of their ends in outer annular shoulders 34A and 34B which bear one against the other on the one hand and against the inner face of the transverse rib 1A1 of the strut on the other hand, and lock nuts 35 are provided at their other end in order thereby to immobilize the inner 20A and outer 20B pins against translational movement relative to one another on the one hand and to immobilize the outer pin 20B against translational movement relative to the lower fitting 17 on the other hand. As a result of such an assembly, the pins 20 contribute to fixing the lower fitting to the strut.

In addition, to allow the two respective lower and upper fittings to have a certain degree of freedom relative to one another, swivel joints 36 are mounted between the outer pins 20B and the superposed links 19 via the respective holes 26, 27.

The advantage of the invention is particularly explicit with regard to FIG. 5.

The left-hand side of this figure schematically represents the rear attachment 7' of the current fixing system, which connects the rear upper longitudinal member 1A' of the strut 1' to the underside 2A' of the wing. The lower fitting 17' of the rear attachment is thus fixed to the upper face 1D' of the longitudinal member of the strut.

By contrast, according to the invention represented on the right-hand portion of FIG. 5, the lower fitting 17 of the system is attached to the rear transverse face or back 1G of the last rib 1A1 of the strut, below the level of the upper face 1D of the longitudinal member, which, for an identical center-to-center spacing between the joint pins 20 (and the same links), makes it possible to bring the strut 1 closer to the wing 2 by a distance D and thereby increase the available distance between the strut and the ground, the consequence of which is that a more powerful engine having a larger diametral dimension can be mounted below the wing starting from a virtually identical fixing system 4.

FIG. 1 also shows, by way of a dot-dash line TM, the siting of a current strut 1' with the existing fixing system. It can thus be seen that arranging the rear attachment 7 at the end of the strut 1 makes it possible to bring this strut closer to the wing structure and gain the distance D.

In the variant embodiment of the rear attachment 7 shown in FIGS. 6 and 7, the lower fitting 17 is composed of two identical plate-shaped components 17A, 17B defining failsafe half-fittings which are arranged side by side. These half-fittings 17A, 17B are, in this variant, integrated with the strut and constitute the last transverse rib thereof.

Projecting perpendicularly from these two half-fittings, and rearwardly in FIG. 3, are longitudinal half-pins 20C, 20D of semicircular cross section which, when the two half-fittings are mounted, define a solid pin of circular cross section 20 having an identical function to the preceding joint pins. The pin 20 may form part of the half-fittings, as is the case in the variant illustrated, or be attached to the half-fittings 17A, 17B in an analogous manner to the fitting of the pins in FIG. 3. Thus, in this variant, the two triangular superposed links 19 are joined to the lower fitting 17 by said pin 20 of the half-fittings (instead of the two pins provided in the preceding embodiment) and to the upper fitting by two pins 20 (instead of only one). The rear attachment 7 is thus connected to the underside of the wing structure by two pins and to the strut bearing the engine by one pin.

Moreover, it can be seen particularly from FIG. 6 that a ring 37 is arranged around the two half-pins 20C, 20D between the half-fittings 17A, 17B and the links 19, which allows the swivel 36, likewise mounted around the half-pins, to be supported and adjusted in terms of depth along the pin 20.

Of course, the upper fitting 18 of the attachment 7 and, in this variant, the two pins attached thereto with the swivels and the nuts are of identical design to the preceding embodiment.

Such a variant embodiment of the rear attachment, illustrated in FIGS. 6 and 7, provides the same advantages as above, in particular that of the strut 1 being brought closer to the wing 2 by virtue of the arrangement of the lower fitting 17 of the rear attachment at the end of the strut.

The invention claimed is:

1. A system for fixing an airplane engine strut to a corresponding wing of a wing structure of said airplane, comprising:
   a front attachment, a rear attachment and an intermediate attachment which connect said strut to said wing and are arranged substantially along the pitch, roll and yaw axes, respectively, of said airplane, said rear attachment being a single attachment and comprising a lower fitting secured to said strut, an upper fitting secured to said wing and at least one link which, by way of parallel joint pins, connects said lower and upper fittings, wherein said lower fitting of said rear attachment has a size substantially similar to a rear transverse face of said strut, has the shape of an open-top clevis, and is arranged fixedly attached on the rear transverse face, in continuation of said strut, wherein the top of said lower fitting is substantially flush with an upper face of said strut.

2. The system as claimed in claim 1, wherein said lower fitting of the rear attachment is a one-piece component fixed to said rear transverse face of the strut and intended to receive said at least one link by way of said joint pins parallel to the roll axis of said airplane.

3. The system as claimed in claim 2, wherein said lower fitting defines said rear face of said strut.

4. The system as claimed in claim 1, wherein said upper fitting of the rear attachment is a U-shaped one-piece component whose base is secured to the underside of said wing.

5. The system as claimed in claim 1, wherein said rear attachment comprises two identical links which are superposed one against the other and connect said lower and upper fittings by way of said joint pins.

6. The system as claimed in claim 1, wherein said link has the shape of an at least isosceles triangular plate whose base is articulated on the lower fitting about two parallel pins, whereas the vertex opposite said base is articulated on the upper fitting about a single pin parallel to the other two pins.

7. The system as claimed in claim 1, wherein said link has the shape of an at least isosceles triangular plate whose base is articulated on the upper fitting about two parallel pins, whereas the vertex opposite said base is articulated on the lower fitting about a single pin parallel to the other two pins.

8. The system as claimed in claim 1, wherein each of said joint pins of said rear attachment is double and comprises a hollow outer pin inside which is concentrically arranged an inner pin, the two pins of each joint pin connecting the link to the corresponding fitting.

9. The system as claimed in claim 1, wherein, on either side of said upper fitting, there are provided reinforcing brackets superposed on said fitting.

* * * * *